United States Patent [19]
Wicker et al.

[11] 3,958,739
[45] May 25, 1976

[54] WELD CENTERING WORKPIECE HOLDER

[75] Inventors: Charles David Wicker, Indianapolis; Donald Louis Tucher, Mooresvill; Charles Dewey Christie, Indianapolis, all of Ind.

[73] Assignee: Wallace-Murray Corporation, Indianapolis, Ind.

[22] Filed: June 18, 1975

[21] Appl. No.: 587,973

[52] U.S. Cl. .................. 228/44.1 R; 219/121 EB; 219/159; 29/200 P; 269/310
[51] Int. Cl.² .................. B23K 15/00; B23K 37/04
[58] Field of Search ........... 228/44.1, 49; 29/200 P; 269/321 ME, 310; 219/121 EM, 121 EB, 159

[56] References Cited
UNITED STATES PATENTS

| | | | |
|---|---|---|---|
| 3,440,392 | 4/1969 | Erlandson et al. | 219/159 X |
| 3,535,487 | 10/1970 | Hinrichs et al. | 219/121 EB |
| 3,555,662 | 1/1971 | Powell | 219/121 EB |
| 3,610,837 | 10/1971 | Vansteenkiste | 219/121 EB |
| 3,906,607 | 9/1975 | Gusev | 29/200 P |

*Primary Examiner*—Al Lawrence Smith
*Assistant Examiner*—K. J. Ramsey
*Attorney, Agent, or Firm*—Thomas J. Greer, Jr.

[57] ABSTRACT

A workpiece holder assembly for aligning a turbine with a turbine shaft without the requirement of an aligning pin received by the workpieces. The workpiece holder assembly receives the turbine shaft and the turbine. Upon depression of the top of the assembly, as by moving the assembly upward so as to engage an abutment, the interface between an end of the turbine shaft and one face of the turbine is exposed. The assembly is rotated over a full circle while the interface receives a welding beam of electrons. The assembly and abutment may be employed with existing electron beam welding apparatus.

9 Claims, 8 Drawing Figures

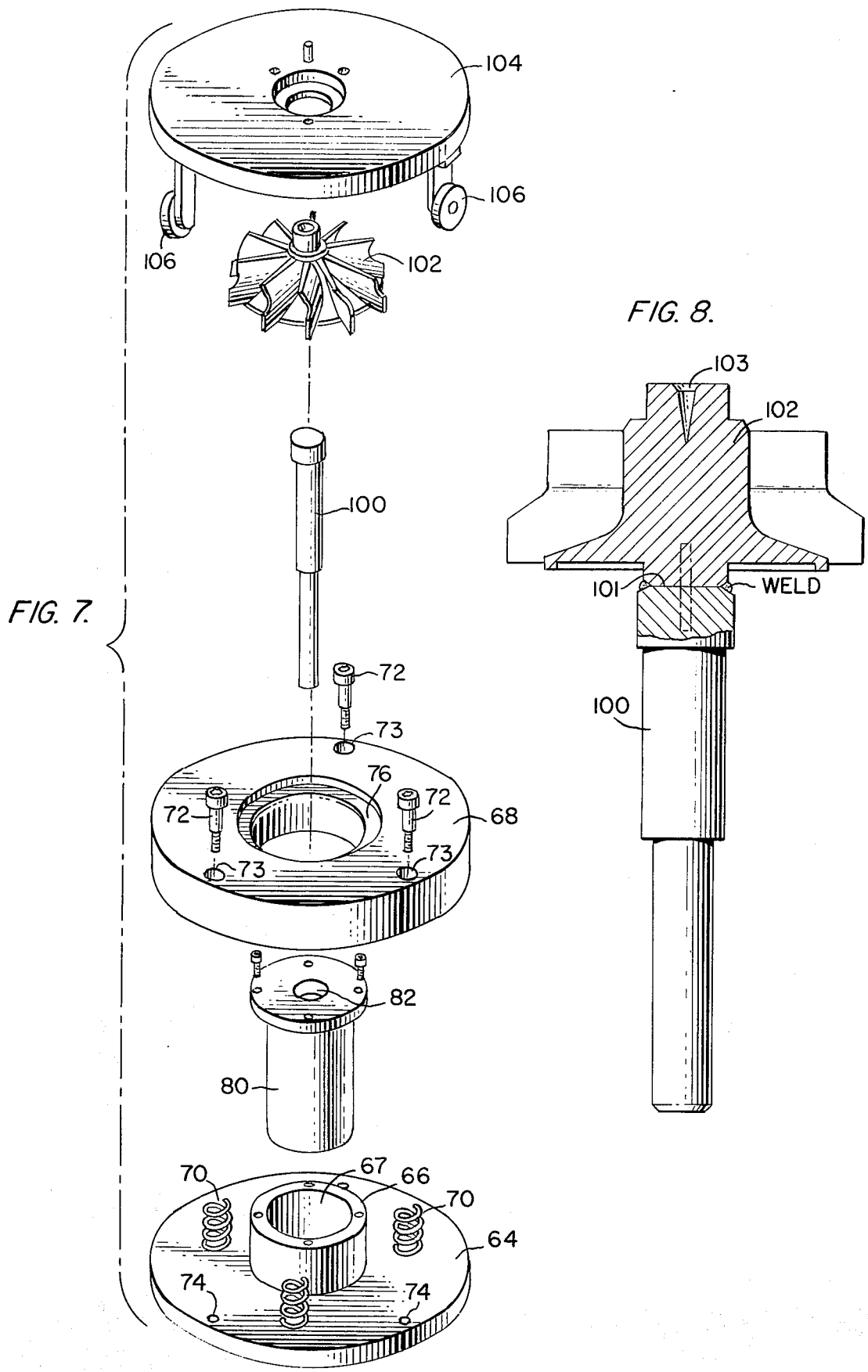

WELD CENTERING WORKPIECE HOLDER

This invention relates to an electron beam welding apparatus and more particularly to a workpiece holder assembly for receiving and accurately aligning a turbine and a turbine shaft to which it is to be joined.

In the manufacture of turbochargers it is necessary to join a shaft to a turbine. The term turbine as used herein is intended to denote a rotary hub element having a plurality of curved and smooth-sided blades against which gases at high pressure or high temperature or both are directed for expansion for the purpose of turning it. The term turbine is sometimes used in this art synonymously with turbine wheel. Further, the term impeller or impeller wheel is also used to denote such an element. Generally, turbines are made from castings, the castings then being machined as by automatic machinery for the purpose of accurately forming the blades with their smooth surfaces. At the completion of this operation, it is necesary to join the turbine to a shaft so that the rotational energy of the turbine may be transmitted for the purpose of doing useful work. In a turbocharger, for example, the turbine and its turbine shaft are coupled to a similar turbine and shaft, with one of these pairs being employed as a motor in the sense of receiving energy from high temperature and high pressure gases, with the other turbine functioning as a compressor for the purpose of compressing ambient air to a higher pressure and/or temperature for the purpose of doing useful work.

One method which has been used in the past for joining a turbine to a turbine shaft has been to align the turbine and the turbine shaft on a work holder, place the work holder within a vacuum chamber and then subject the interface between the end of the turbine shaft and the turbine to a beam of electrons directed generally at right angles to the axis of the turbine shaft. While so subjected to the beam of electrons, the turbine and turbine shaft are rotated so that a full circle weld may be made. One such machine for carrying out this operation is known as Sciaky brand electron beam welder, designated as type CV 1-S-1BDZ. In carrying out the welding operation when using such a typical prior machine, an operator places the turbine shaft in a work holder, the shaft being provided at one end with a central aperture of relatively short depth. An aligning pin is placed by the operator into the aperture. Thereafter, the turbine which has been provided with an aligning aperture in its bottom face is placed on top of the end of the turbine shaft, with the aligning pin being received by both members to thereby accurately align the turbine with the turbine shaft. It is important that the alignment of the turbine and its turbine shaft be as perfect as possible because of the extremely high speeds encountered. Rotational speeds of 40,000 rpm and higher are often realized in turbocharger devices and any misalignment between these two elements would result in undesirable vibration and possible failure of the device. While such a machine and method of assembly have proved satisfactory from the viewpoint of practicality, the expense of providing the turbine shaft and the turbine with the aligning apertures and with the aligning pin is not insignificant, particularly when it is noted that these devices are assembled in the manner indicated by hand.

According to the practice of this invention, the requirement of aligning apertures in the turbine and the turbine shaft and the aligning pin is no longer present. The novel workpiece holder assembly of this invention permits the insertion of the turbine shaft into the work holder, as before, yet permits the simple placing of the turbine on top of the work holder, which placing automatically and accurately aligns the turbine and its shaft so that the two elements are coaxial. Thereafter, the novel work holder assembly of this invention is, as before, placed into a vacuum chamber, with continued upward motion of the workpiece holder assembly exposing the interface to the action of a beam of welding electrons. During the welding operation the turbine and the turbine shaft are clamped together so as to maintain their desired alignment, with the electron beam performing its action over a full circle.

IN THE DRAWINGS

FIG. 7 is an exploded view illustrating the complete novel workpiece holder assembly of this invention with a turbine shaft and a turbine.

FIG. 8 is a partial cross-sectional view illustrating an assembled turbine and turbine shaft at the completion of the welding process and also illustrating, in phantom lines, the prior use of an aligning pin.

Figure 1:
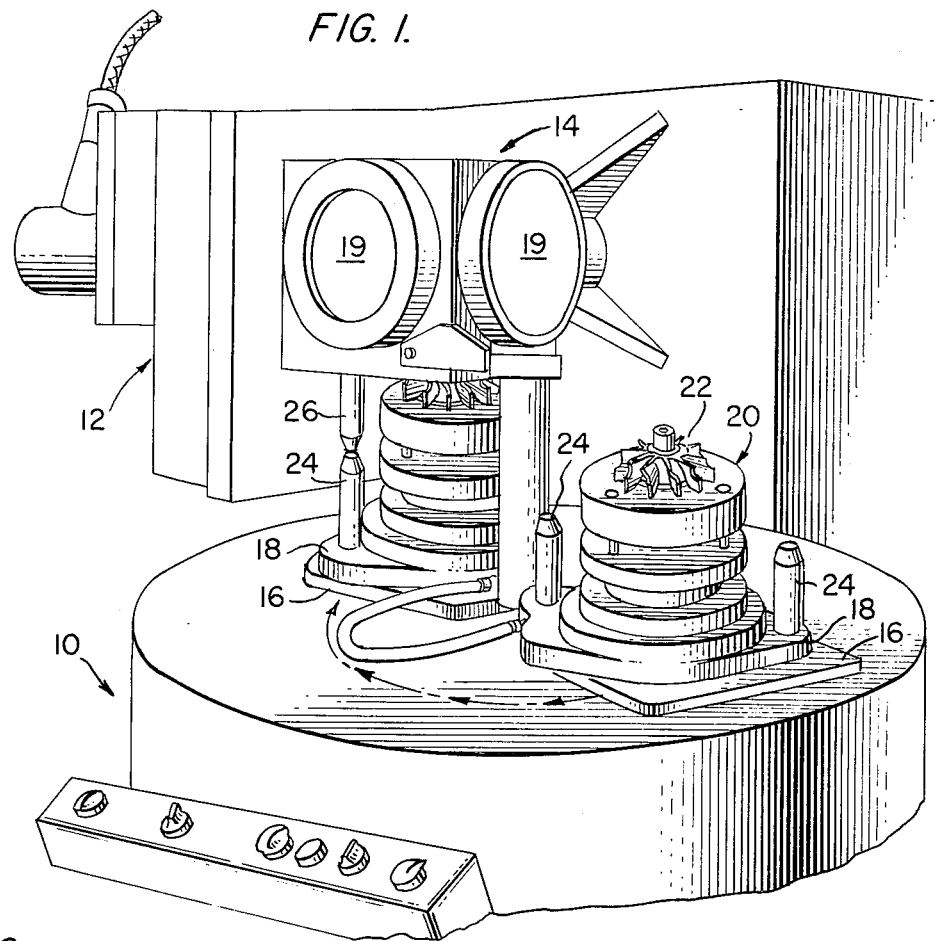
FIGS. 1 and 2 are partial perspective views of a typical prior art electron beam welding assembly for the welding of a turbine to a turbine shaft.
Figure 2:
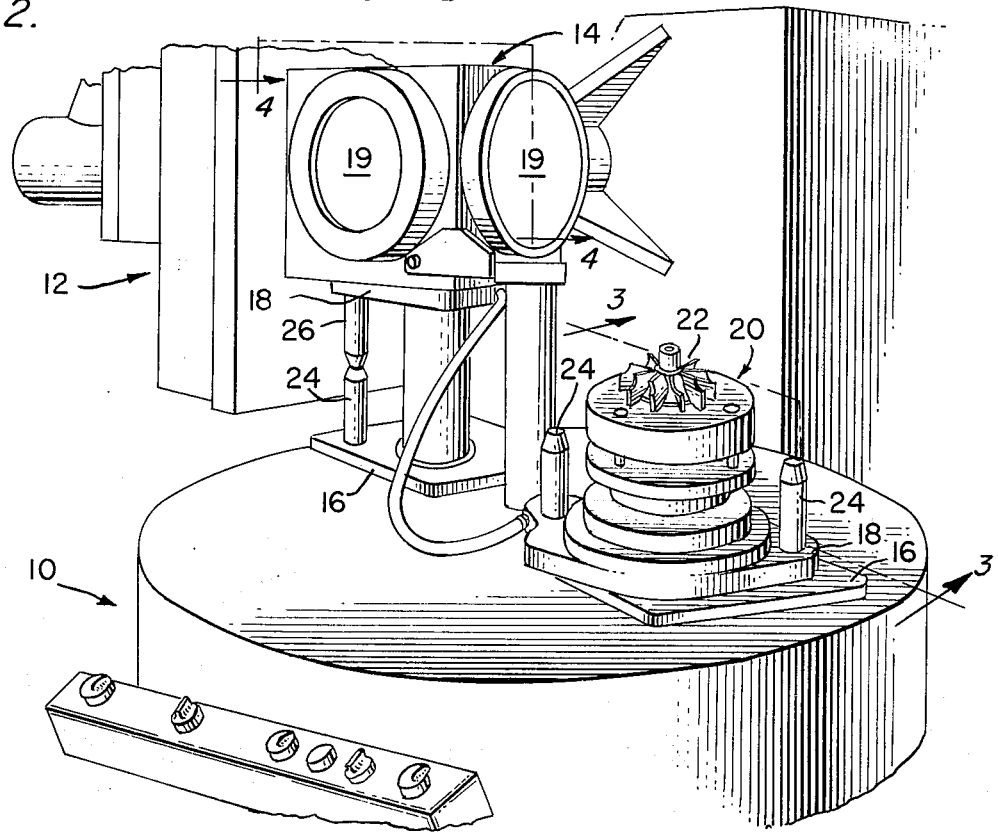

Referring now to FIGS. 1 and 2 of the drawings, a typical prior art machine for the electron beam welding of an impeller to an impeller shaft is depicted. One such machine is known as a Sciaky electron beam welder, type CV 1-S-1BDZ and includes a rotatable work table denoted by the numeral 10 positioned generally below the electron beam gun holder and frame 12. The latter includes a vacuum chamber 14 into which articles to be welded are carried by one work holder and receive while therein a beam of electrons from an electron gun. A portion of the electron gun is indicated as extending out from the frame, by the designation E.B. Gun. As will now be explained, while the welding operation is taking place, an operator is positioning additional parts to be welded on another work holder.

The numeral 16 denotes two diametrically opposite support plates carried by rotatable table 10 each of which receives work holder supporting element 18. The prior art work holders are denoted generally by the numeral 20 and are each adapted to receive an impeller shaft (not illustrated at FIGS. 1 and 2) adapted to be joined by electron beam welding to an impeller 22. In operation, the impeller shaft is placed in work holder 20, a locating pin inserted by hand into a recess carried by the shaft and extending into a recess in the bottom face of the impeller. The impeller 22 is accordingly positioned and supported on the top end of the shaft, aligned therewith by the locating pin. The relation is shown in FIG. 8, the (prior art) locating pin denoted by dashed lines. Thereafter, one of the switches on the illustrated control panel is actuated to cause the table 10 to rotate 180° to assume the position illustrated at FIG. 1, one work holder 20 positioned directly beneath the vacuum chamber 14. By a programmed switching cycle (automatic cycle) the work holder rises, carried upwardly by standard 28, coming to rest when the entire holder 20 is within vacuum chamber 14. The work holder 20 is guided by means of upwardly extending pins 24 positioned on the rotatable table 10 and downwardly extending pins 26 carried by the vacuum chamber in alignment therewith. The work holder 20 now within the vacuum chamber 14 and plate member 18 seals the bottom opening of chamber 14. A spring-urged centering pin at the chamber top engages the impeller. A vacuum is applied and the electron beam action initiated. The work holder 20 is rotated about standard 28 so as to expose the entire circumferential extent of the (circular) interface of the impeller and the impeller shaft which is to be joined to the electron beam. The resultant weld is denoted at FIG. 8. Thereafter, by the programmed automatic cycle, the work holder 20 is withdrawn from the chamber 14. The turntable 10 rotates in response to another control signal and the process repeated with the other work holder. Thus, while one of the two work holders 20 is within the vacuum chamber 14 and the welding operation taking place, the operator may remove the welded-together workpieces carried by the other work holder and also insert new, separate workpieces in their proper relation for the next welding operation.

While functioning in the intended manner of electron beam welding of parts, the described prior art machine is not entirely satisfactory. For example, in order to properly align the impeller shaft and the impeller, it is necessary to drill a locating hole in each of these two elements, and to manually insert a locating pin so that when the operator places the impeller wheel 22 onto the top of the shaft, the parts will be properly aligned. This represents several distinct areas of cost. Furthermore, a distinct manual step is required in the placing of the pin in the locating hole on the shaft and on placing the impeller wheel so that its alinging recess fits over the aligning pin.

Referring now to FIGS. 3–8 of the drawings, a description will now be given of the improved work holder assembly according to the practice of this invention. The numeral 40 denotes a supporting base element and is of the same construction and function as base element 18 of the prior art construction illustrated at FIGS. 1 and 2. Again, the vertically reciprocating standard 28 performs a support function, here the function of supporting plate 40 and a workpiece holder assembly. The numeral 42 denotes an annular seal and is attached, as by threaded fasteners 43, to frame portion 15 of vacuum chamber 14. The numeral 44 denotes an upstanding annular rim integral with member 42. The numeral 46 denotes a bearing retaining ring, generally annular, and fastened to the top surface of plate 40, the latter including a sloping annular portion 48.

The numeral 50 denotes a second vertical standard telescopingly received within standard 28 and whose upper ends contact supporting ring 52. An annular ball-bearing race denoted by the numeral 54 is positioned between a countersunk recess within plate 40 and the exterior of member 52. Another supporting plate 60 is positioned on element 52 and supports plate 64, the latter being secured together as by threaded fasteners. The arrangement of parts is such that standard 52 may be raised or lowered in synchronism with standard 28 by a mechanism the details of which are known and form no part of this invention. Further, standard 50 is relatively rotatable with respect to standard 28 so that upon such rotation, the inner race of the bearing assembly 54 rotates with respect to stationary outer race. Upon such rotation, elements 60 and 64, as well as other elements to be described later, also rotate.

Element 64 is referred to as a lower base plate which is positioned below an upper base plate 68. A plurality of angularly disposed compression springs 70 is positioned in cavities carried by these base plates. A plurality of angularly displaced retaining pin members 72 is provided, with the lower portion of each being threadedly received by plate 64 and the upper portion of each received by recesses 73 in plate 68. The arrangement of parts is such that springs 70 normally bias or hold upper base plate 68 parallel to and coaxial with, but spaced from, lower base plate 64. Retaining members 72 limit the amount of upward displacement or movement of upper base plate 68 from the lower base plate 64. Upper base plate 68 is, however, free to move downwardly upon the exertion of force thereon, as will presently be described. The upper surface of plate 68 carries a countersink portion 76 adjacent the central plate aperture. This countersink is termed a centering recess.

As may be seen most clearly at FIG. 7, a retaining cup denoted by the numeral 80 is provided with an integral, upper flange which is supported on an upper, integral collar portion 66 of plate 64. Collar 67 defines a central recess for the reception of flanged retaining cup 80. The latter has central aperture 82 adapted to receive a turbine shaft 100. The upper portion of turbine shaft 100 is enlarged, the bottom of the enlarged portion resting upon the countersink portion 76 in the retainer cup.

Figure 3:
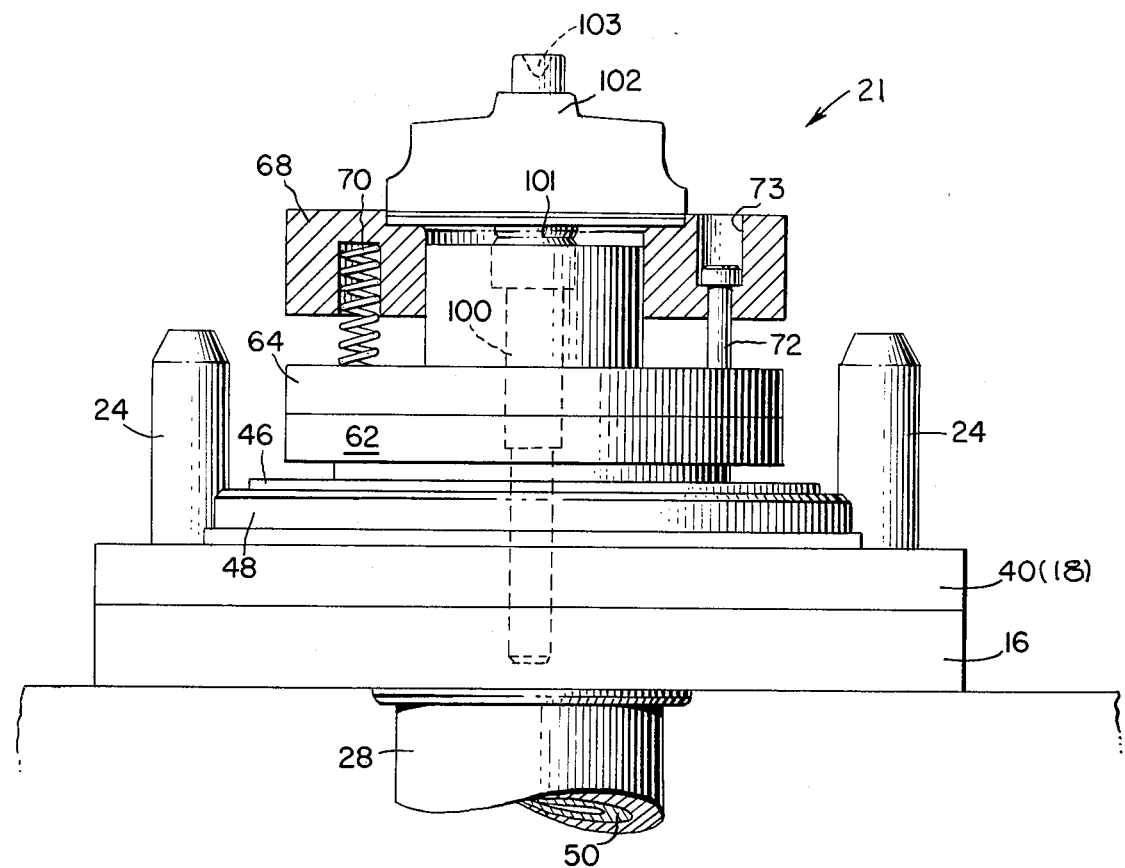
FIG. 3 is a partial elevational view of the novel workpiece holder assembly of this invention and illustrates a turbine shaft and a turbine placed therein.
Figure 5:
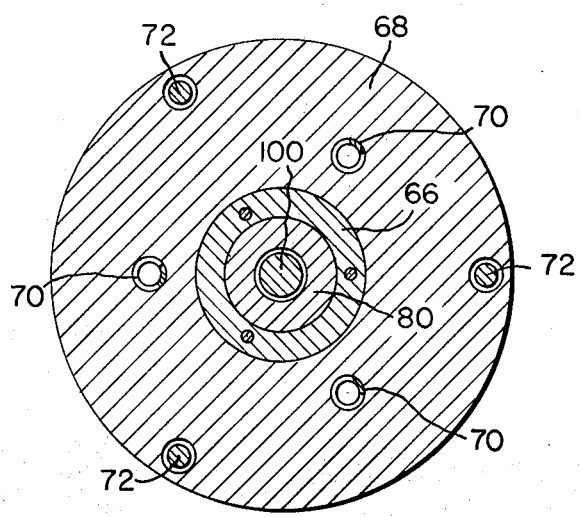
FIG. 5 is a view taken along section 5—5 of FIG. 4.
Figure 6:
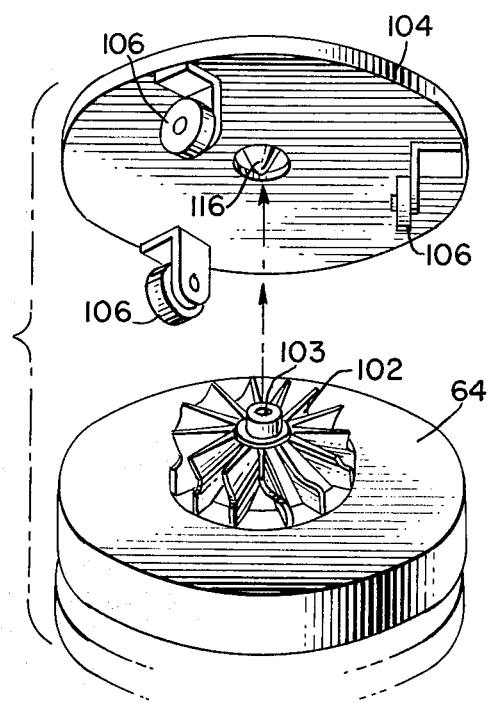
FIG. 6 is an exploded view showing the relationship between a portion of the novel workpiece holder assembly of this invention and a novel abutment of this invention.
Figure 4:
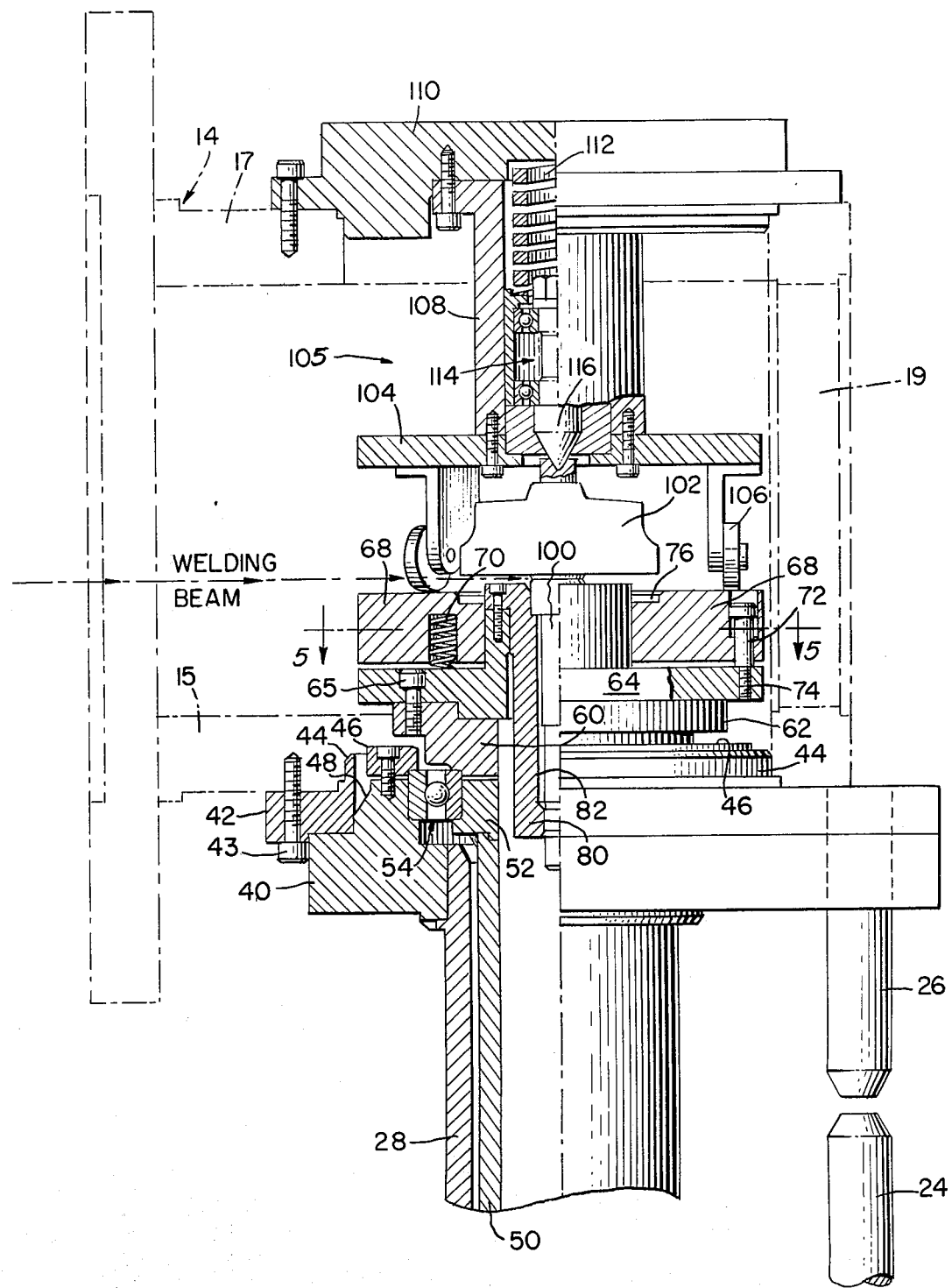
FIG. 4 is a partial cross-sectional view in elevation, along section 4—4 of FIG. 2, with the machine of FIG. 2 provided with the novel workpiece holder assembly of this invention.

According to the practice of the present invention the elements thus far described are employed with the apparatus of FIGS. 1 and 2, it being understood that the work holder 20 is not employed, rather, plate member 64 and the elements above described and shown at FIGS. 3 and 4 are utilized. Thus, the rotatable work table 10 is provided with a pair of work holder assemblies such as shown at FIG. 3 and, while one welding operation is taking place within the vacuum chamber 14, an operator is removing a completed welded assembly and inserting the elements for a new assembly. For the purpose of distinguishing the work holder assemblies, the numeral 21 will denote the work holder assembly according to the present invention, with the numeral 20, as described above, denoting the prior art work holder assembly. The details of the latter are not required for an understanding of this invention.

An operator initially places a turbine shaft 100 in the holder 80, the shaft dropping down into the assembly 21 to a position indicated at FIG. 3. In this position, the top end surface of turbine shaft 100 is below the top surface of upper supporting plate 68. Next, turbine 102 is placed in centering recess 76, a peripheral portion of the turbine being snuggly engaged by the sides of the recess. This accurately positions and centers the turbine with respect to the turbine shaft 100 and thus does away with the requirement for the prior art locating pin. As shown at FIG. 3, upon such placement of the turbine in recess 76, a lower nub portion on the lower face of the turbine engages the top of turbine shaft 100. However, there may be a clearance. Also as indicated at FIG. 3, a centering recess 103 is provided on the upper face of turbine 102 for the purpose which will presently be explained.

Assume holder assembly 21 of FIG. 3 is beneath the vacuum chamber 14. A switch is actuated by an operator and standars 28 and 50 rise, carrying holder assembly 21 up into the vacuum chamber, with the upper flange of plate 40 sealingly engaging plate 42. The extreme vertical extent of such motion is depicted at FIG. 4, with upper base plate 68 being contacted by an abutment assembly denoted generally by the numeral 105. The abutment assembly 105 includes a generally circular plate 104 (see also FIG. 7) from which downwardly depends a plurality of rotary abutment members defined by downwardly extending brackets having rotary members 106 pivoted thereto. The numeral 108 denotes a collar whose lower end is secured to plate 104 and whose upper end is provided with a flange and angularly disposed threaded fasteners for attachment to a frame member 110, the latter in turn secured as by threaded fasteners to a portion 17 of the vacuum chamber frame. Coil compression spring 112 has its upper end abutting against a portion of plate 110 and its lower end abutting against a rotary bearing 114, the latter carrying centering pin 116.

Upper movement of the base plates 68 and 64 has carried with it turbine shaft 100 and turbine 102, with the tip of centering pin 116 having entered centering depression 103 in the turbine. The spring 112 is now further compressed, with the result that turbine 102 is squeezed between centering pin 116 and turbine shaft 100. Innermost standard 50 is now caused to rotate, causing upper and lower plates 64 and 68, respectively, to rotate, in turn causing turbine shaft 100 and turbine 102 to rotate. Centering pin 116 is free to rotate because of ball bearing assembly 114. The top surface of upper base plate 68 rotates relative to the roller elements 106 and their fixed mounting brackets and a welding beam of electrons, directed as indicated at FIG. 4, strikes the interface 101 between shaft 100 and turbine 102. The path of the electrons being fixed relative to the abutment assembly 105, itself also fixed, permits the welding beam to execute a full circle with respect to interface 101. In practice, the elements to be joined may be rotated two or three or more times, depending upon the nature and degree of the final weld which is desired.

At the conclusion of the weld process, the work holder assembly 21 is withdrawn from the vacuum chamber 14, the table 10 rotated, and the other work holder 21, which has now been provided with the turbine shaft and turbine in the relationship shown at FIG. 3, placed beneath the vacuum chamber 14 for a repetition of the cycle.

The work holder 21 of this invention includes those elements between and including plate 104 and plate 64. The remainder of the elements were already known prior to the invention. The work holder may be employed with any machine which can perform the described raising, lowering, rotating, etc., functions performed by the noted Sciaky brand machine. Further, while the work holder has been described in relation to electron beam welding, it clearly exhibits utility with other types of welding processes, such as oxy-acetylene, electric, and inertia.

While the invention has been illustrated and described as exhibiting utility in welding a shaft to a turbine, it will be apparent that it may be employed to accurately position a shaft end with respect to any hub element prior to welding.

What is claimed is:

1. A workpiece holder assembly for positioning a hub element such as a turbine with respect to a shaft end such as a turbine shaft in aligned and abutting relation, said holder including,
   a. a lower base plate having a central recess extending therethrough,
   b. the said central recess having means receiving and supporting a vertically disposed turbine shaft, the upper end of the shaft being adapted to be welded to one face of a turbine,
   c. an upper base plate parallel to and coaxially disposed with relation to said lower base plate,
   d. means for normally holding said upper base plate spaced from said lower base plate, against the force of gravity,
   e. a centering recess centrally of said upper base plate, said recess adapted to receive a turbine whose axis of rotation is vertically disposed and coaxial with the longitudinal axis of a turbine shaft,
   f. the upper end of a turbine shaft which is to be welded to a turbine adapted to be positioned below the top surface of the upper base plate in the normal position of the upper and lower base plates relative to each other,
   g. whereby upon depression of the upper base plate relative to the lower base plate a sufficient distance, the top of the upper base plate is adapted to move to a position below the top of a turbine shaft and an impeller is adapted to abut against the upper end of an impeller shaft.

2. The workpiece holder assembly of claim 1 wherein said (d) means is defined by resilient elements positioned between said upper and lower base plates.

3. The workpiece holder assembly of claim 2 wherein said resilient elements are defined by a plurality of angularly spaced coil springs positioned between the said upper and lower base plates, the said springs being under compression.

4. The workpiece holder assembly of claim 3 including means for limiting the separation between said two base plates.

5. The workpiece holder assembly of claim 1 wherein said (b) means is a sleeve having an upper flange therearound, said upper flange supported by and resting on an upwardly extending collar integral with said lower base plate.

6. The workpiece holder assembly of claim 1, including,
   a. means to support said lower base plate for vertical movement and for rotational movement about a vertical axis, whereby the workpiece holder assembly may be raised and lowered and may be rotated,
   b. an upper abutment assembly fixed above said two base plates and carrying at least one downwardly extending abutment,
   c. whereby upon upward movement of the lower base plate the upper base plate is abutted by the rotary abutment to thereby depress the upper base plate with respect to the lower base plate and expose an abutment of a turbine shaft and a turbine to a welding beam of electrons, and whereby rotation of the lower base plate over a full circle permits electron beam welding over a full circle.

7. The workpiece holder assembly of claim 6, including,
   a. a downwardly biased and vertically extending centering pin carried by said upper abutment assembly, said centering pin adapted to abut and center a turbine upon extreme upward movement of said lower base plate, whereby upon extreme upward movement of the lower base plate a turbine is adapted to be clamped by the upper end of the turbine shaft and the centering pin.

8. The workpiece holder assembly of claim 7 wherein said centering pin is spring biased in a vertically downward direction.

9. The workpiece holder assembly of claim 8 wherein said centering pin is mounted for rotation about its own vertical axis.

* * * * *